Patented Nov. 3, 1936

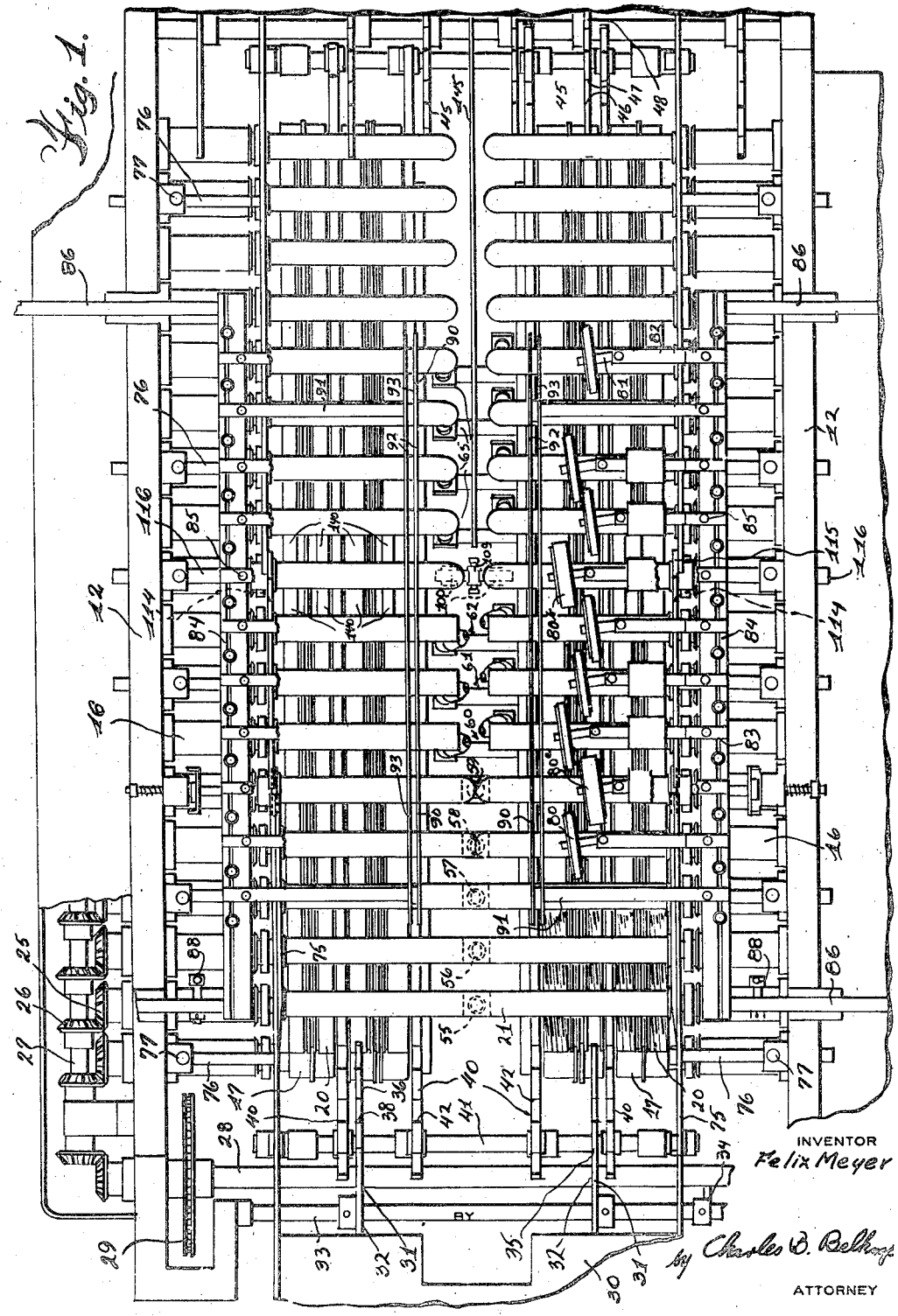

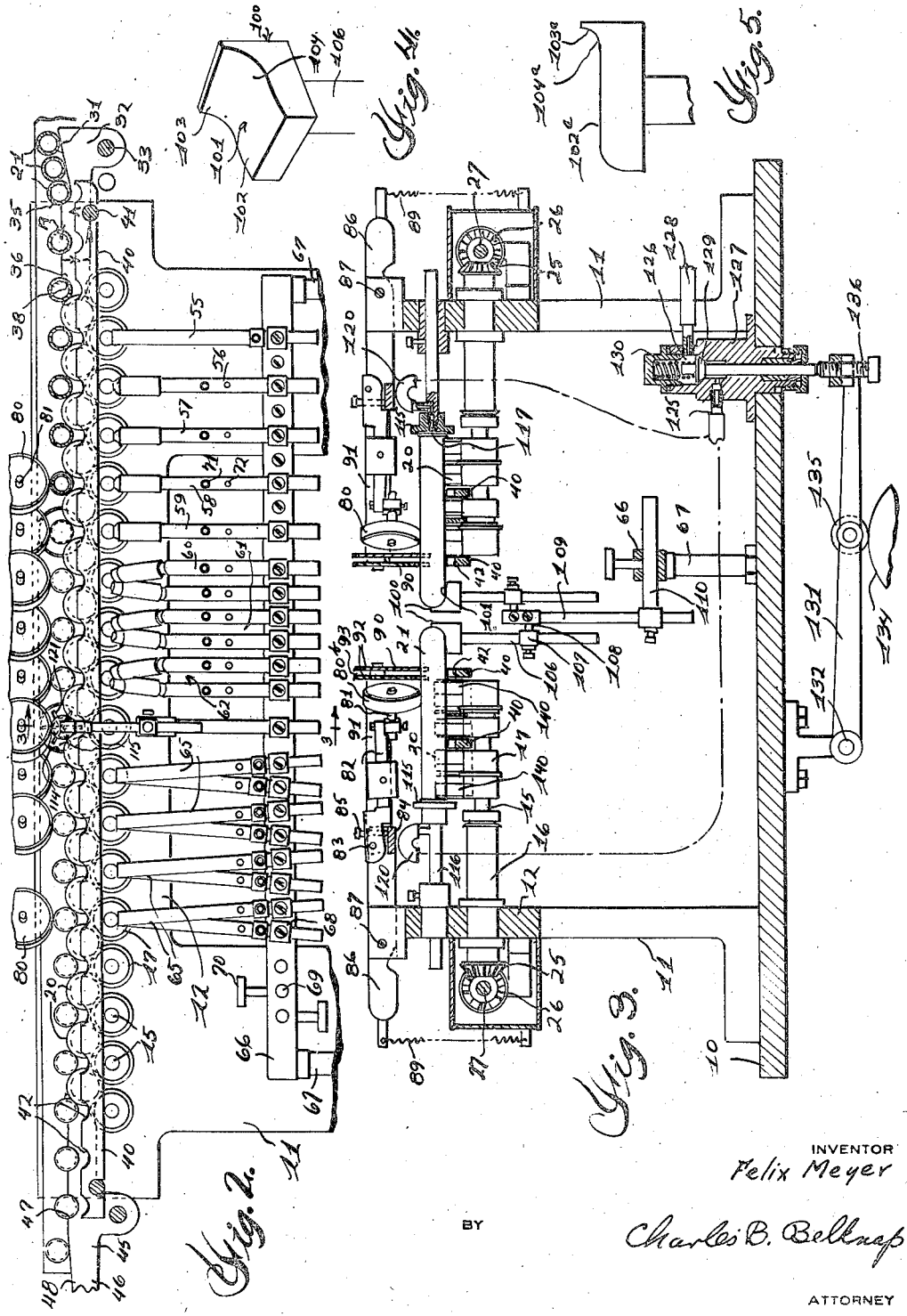

2,059,474

UNITED STATES PATENT OFFICE 2,059,474

METHOD OF AND APPARATUS FOR FORMING GLASS BODIES

Felix Meyer, Aachen, Germany, assignor to Kimble Glass Company, Vineland, N. J., a corporation of Illinois Application October 23, 1933, Serial No. 694,731

16 Claims. (Cl. 49—7)

This invention relates to a method for forming glass bodies and to an apparatus by which said method may be expeditiously performed.

One of the primary objects of this invention is to provide a method and apparatus by which ends of uniform shape and thickness may be formed on cylindrical glass bodies or the like.

A further object of this invention is to provide a method and apparatus by which an end may be formed on a glass body without enclosing the end to be formed in a mold or the like.

Still further the invention contemplates the provision of certain improved features in an apparatus by which glass tubes or the like may be subjected to the above and other forming operations.

Other objects and advantages of this invention will become more apparent as the following description proceeds, particularly when reference is had to the accompanying drawings wherein:

Figure 1 is a semi-diagrammatic fragmentary top plan view of an apparatus disclosing the invention, certain parts of the machine being broken away;

Figure 2 is a semi-diagrammatic fragmentary longitudinal sectional view through the machine shown in Figure 1;

Figure 3 is a transverse sectional view taken substantially on the line 3—3 of Figure 2;

Figure 4 is a detail perspective view of the forming tool shown in elevation in Figure 3; and Figure 5 is an elevational view of a modified forming member which may be substituted for that disclosed in the preferred embodiment of the machine.

To facilitate the description of the invention, numerous details of the machine in which the invention is embodied have been omitted from the drawings. Further numerous of the elements disclosed in the drawings are shown semi-diagrammatically only since they form no part of the present invention. The diagrammatic showings however, of the machine will illustrate the general type of machine to which the present invention relates and will emphasize the advantages obtained by the present invention.

Referring then particularly to the drawings wherein like reference characters designate corresponding parts throughout all views, the numeral 10 designates a platform or bed plate which is suitably supported in any desired manner (not shown) in spaced relation to the floor. Much of the actuating mechanism of the machine which forms no part of the present invention and which therefore is neither illustrated nor described, is located below this platform.

Mounted on the platform 10 at opposite ends and opposite sides thereof are uprights 11 and supported on the upper ends of these uprights are longitudinally extending frame members 12. These frame members are spaced from each other throughout their length and constitute the sides of the machine. Fixedly secured to stub shafts 15 journaled in bushings 16 mounted at spaced points longitudinally of the frame members 12 are rollers 17. The rollers extend inwardly from the frame members toward the center of the machine but terminate short of the center of the machine as clearly illustrated in Figure 3 of the drawings. The rollers are, as illustrated in Figure 1 of the drawings, arranged in rows with their axes parallel and each roller supported from one frame member 12 has its axis aligned with a corresponding roller supported in the opposite frame member 12.

The rollers 17 constitute main supporting and driving rollers as will hereinafter be more fully described. Supported on these rollers are auxiliary rollers 20, these latter rollers being supported in the angles between adjacent rollers in the same row so as to be frictionally driven by the rollers 17. The rollers 20 preferably have their surfaces grooved as illustrated, the manner of grooving these rollers and the reason therefor being more clearly brought out in my co-pending application Serial No. 694,728, filed October 23, 1933. Further, the rollers 20 are prevented from moving both axially and laterally with reference to the rollers 17 in the manner and for the reason brought out in another of my co-pending applications Serial No. 694,729, filed October 23, 1933.

The auxiliary rollers 20 constitute supports for blanks 21 to be formed, these blanks being shown as glass tubes. The blanks are supported in the angles between adjacent rollers 20 and during the operation of the machine are rotatably driven by the rollers 20, these rollers being in turn rotatably driven by the rollers 17. For rotatably driving the rollers 17 each shaft 15 has fixed thereto a beveled pinion 25. These beveled pinions are engaged by pinions 26 carried by shafts 27, one shaft being rotatably supported on the outer side of each frame member 12. The shafts 27 are in turn driven from a main drive shaft 28 to which a sprocket wheel 29 is fixed, this sprocket wheel being driven from any suitable source of power (not shown).

By reference to Figure 1 of the drawings it will be noted that the blanks 21 are fed to the left hand end of the machine, as viewed in this figure, in the form of elongated tubes. The blanks travel longitudinally of the machine and are first separated into two halves. The adjacent ends of the sections thus formed are then subjected to bottom forming operations, the blanks leaving the right hand end of the machine in the form of test tubes or like bodies each being closed at its one end.

For feeding the blanks into the machine there is provided an inclined channel 30, this channel being of sufficient width to readily receive the blanks. From the channel 30 the blanks roll by gravity onto the upper inclined edges 31 of plates 32, these plates being fixedly mounted in spaced relation to each other on a shaft 33. The shaft 33 is rotatably journaled in a suitable portion of the machine frame so that it may be rocked by a lever 34 for a purpose which will hereinafter be more fully described.

As illustrated in Figure 2 of the drawings, the inclined edge 31 of each plate 32 terminates at its forward end in a shoulder 35 which constitutes a stop for the blanks lying on the edge 31. Beyond the shoulder 35 each plate is extended to form the arm 36 provided in its upper edge with blank supporting recesses 38, these recesses being adapted to temporarily support the blanks during their entrance into the machine.

For moving the blanks longitudinally of the machine and for guiding the blanks during this movement transport rails 40 are provided. Four of these rails are illustrated in the drawings, it being understood, however, that any number of these rails may be provided and that they may be located wherever desired transversely of the machine to effect the desired lifting movement of the blanks.

The transport rails are supported at their ends on actuating shafts 41, these shafts being suitably actuated in any desired manner (not shown) to impart an oscillating movement to the transport bars. The movement imparted to the bars is diagrammatically shown by the arrows designated A in Figure 2 of the drawings.

Each transport bar is provided in its upper edge with spaced blank receiving recesses 42 in which the blanks rest during the movement from each processing station to the next. At the discharge end of the machine, plates 45 are mounted, these plates having arms 46 recessed as at 47 to receive the blanks just prior to their discharge from the machine. Each plate 45 is also provided with an inclined smooth edge 48 onto which the blanks are finally deposited, the blanks rolling on these portions of the plates into a suitable receiving channel or container (not shown).

The operation of the machine as thus far described is as follows: Blanks positioned in the channel 30 roll by gravity to the position shown in Figure 2 of the drawings, one blank always being in engagement with the shoulders 35. The transport bars are operated to periodically lift one blank from the inclined edges 31 of the plates 32 and to position this blank in the first recess 38. Thereafter the blanks are periodically moved longitudinally of the machine being intermittently supported on the rollers 20 as will be clearly apparent from Figure 2 of the drawings. Finally the blanks are deposited by the transporting bars onto the inclined supports 48 from which they roll by gravity to a suitable container or the like. Whenever it is desired to stop the feeding of the blanks to the machine, the shaft 33 may be rocked by the lever 34 to raise the plates 32 to a position where the blank in engagement with shoulders 35 will not be picked up by the transport bars. Thereafter only those blanks in the machine will be processed as will be apparent.

For heating the tubes during their travel through the machine suitable burners are provided, these burners being disposed substantially centrally of the machine and below the place of support of the blanks. The flames from the burners play against the blanks as the latter are rotated to heat the blanks to the desired extent at each of the several stations.

Referring then particularly to Figure 1 of the drawings, the burners 55 and 56 serve to preheat the blank, the burner 55 preferably being an ordinary Bunsen burner, and the burner 56 being fed with compressed air and illuminating gas. The next three burners 57, 58 and 59 are supplied with illuminating gas and oxygen, the burners 57 and 58 serving to heat and somewhat constrict the blank and the burner 59 operating in conjunction with certain superposed rollers as will hereinafter be described, to separate the blank into two parts. Thus the blank will, by these burners, be divided into two sections each having a closed end.

The next three burners, 60, 61 and 62 are double burners and are fed with illuminating gas and compressed air. These burners heat the ends of the blank to such a degree that these ends may be blown at the next station as will hereinafter be more fully described.

After the blowing or bottom shaping station, there are provided four burners 65, which may be ordinary Bunsen burners and which serve to anneal the tubes during their travel through the next four stations. In the three following stations the tubes are turned without annealing fires so that they are cooled somewhat before they are discharged from the machine.

For adjustably supporting the burners there is provided a bar 66 which extends longitudinally of the machine and which is supported from the platform 10 as by uprights 67. Each burner is clamped in a sleeve 68 for vertical adjustment therein and each sleeve is provided with a laterally extending shank 69 which passes through the bar 66 and is adapted to be adjustably clamped therein by a set screw 70. Thus it will be apparent that each burner may be adjusted both vertically and laterally with respect to the several blanks supported by the machine.

The burner pipes are provided with suitable openings 71 and 72 to which flexible hoses are attached for supplying the desired gases to the burners. Thus, as brought out before, certain of the burners will be supplied with gas alone, others with compressed air and gas and still others with gas and oxygen, the flexible hose being connected to the proper sources of supply in each case. The means for supplying the desired gases to the hose connections and the means for controlling the supply of gases to the burners is not disclosed since the same forms no part of the present invention.

Extending longitudinally of the machine adjacent the outer ends of the rollers 20 are back stop or guide rails 75. These rails are adjustably secured to the frame members 12 by rods 76 which are secured to the guide rails and are held in adjusted position with respect to the frame members by set screws 77. The guide rails may thus be adjusted toward or away from each other depending upon the length of the blanks to be processed.

Engaging the blanks at certain of the processing stations are superposed rollers 80. These rollers are rotatably supported on stub shafts 81 which are adjustably secured to the ends of arms 82. Each arm 82 is pivotally mounted as at 83 on a carrier bar 84 there being preferably provided a set screw 85 with each arm for vertically adjusting the same with respect to the carrier bar. Each carrier bar is supported by arms 86 pivotally mounted as at 87 on the frame 12 of the machine, whereby these arms may be rocked to raise the carrier bars 84 and thus the rollers 80 during the movement of the blanks from one processing station to the next.

For rocking the arms 86 to raise the carriers and the rollers, one arm 86 on each side of the machine is engaged by an arm 88 which may be suitably actuated by a cam (not shown). Springs 89 connected to the outer ends of the arms 86 aid in counterbalancing the weight of the rollers 80.

The rollers 80 are formed of rubber or some like substance and are adapted to rest upon and frictionally engage the blanks. The rollers are canted or oblique to the axes of the blanks so that they tend to draw the blanks toward the guide rails 75. It is to be noted that the second rollers 80ᵃ are particularly wide so that they exert sufficient pull on the blanks during the separation operation to pull the halves of the blanks apart as clearly illustrated in Figure 1 of the drawings.

For protecting the rollers from the heat of the burners, guards 90 are provided. These guards are carried by arms 91 fixed to the carriers 84 and assume positions between the rollers 80 and the burners. Each guard preferably comprises spaced plates 92 to provide an insulating air space 93. The lower edges of the plates 92 are notched or recessed to fit over the blanks as clearly illustrated in Figure 3 of the drawings and it will be understood that these plates are raised with the rollers 80 during the movement of the blanks to the several processing stations.

As brought out before it constitutes a feature of this invention to provide means for forming uniform bottoms on the separated blanks. To accomplish this, the structure disclosed more particularly in Figure 3 of the drawings is provided. At the forming or blowing station, that is the station immediately after the station at which the two halves of the blank are subjected to the action of the burners 62, suitable forming tools 100 are provided. One of these forming tools is shown in detail in Figure 4 of the drawings as comprising a block having an upper surface 101 shaped to conform to the longitudinal contour which it is desired to impart to the glass tube at the end thereof. In the form illustrated, the surface comprises a portion 102 which engages the side of the blank adjacent the end thereof, a portion 103 which engages the end of the blank and a curved portion 104 which connects the portions 102 and 103. Transversely the surface 101 is flat so that the tube may be readily placed in engagement with this surface by the transfer bars 40.

Each block is fixed to the upper end of a stem 106 and each stem is mounted for vertical adjustment in a sleeve 107. Each sleeve 107 has a shank 108 mounted for lateral adjustment in the upper end of a stem 109, this stem being in turn adjustably supported from the bar 66 by an arm 110. The arrangement is such that the several forming tools may be properly located both laterally and vertically with reference to the blanks to be formed.

During the end forming operation the open ends of the tube sections are drawn by the wide superposed rollers 80ᵇ into engagement with suitable discs 115 located in openings 114 in the side rails. Each disc is rotatably mounted on the end of a shaft 116 adjustably mounted in the adjacent frame member 12. Each disc is provided with a central aperture 117 which registers with a bore 118 formed in the end of its respective shaft 116 and each shaft is provided with a nipple 119 to which a hose 120 may be connected for supplying air under pressure to the bore 118 and thus by way of aperture 117 to the interior of the glass tube. The face of each disc is preferably provided with radial grooves 121 which permit the excess air to escape as will be readily apparent. The hoses 120 are united and are connected to a nipple 125 to which air under pressure is supplied from a chamber 126. This chamber is formed in a suitable housing 127 supported on the platform 10 and is supplied with air under pressure by a conduit 128 which leads to any suitable source (not shown).

A valve 129 normally held closed by a spring 130 controls the flow of air under pressure from chamber 126 to nipple 127 and this valve is adapted to be actuated by a lever 131 pivoted as at 132 on a bracket secured to the under side of the platform. A cam 134 suitably actuated in any desired manner engages a roller 135 carried by the lever 131 intermediate the ends thereof to periodically actuate this lever. The degree of opening of the valve 129 incident to any predetermined throw of the lever 131 may be adjusted by adjusting the pin 136 which provides the actuating connection between the end of the lever and the stem of the valve.

In view of the friction between the ends of the tubes and the tools opposing rotation of the blanks during the bottom forming operation, the rollers 20ᵃ on which the blanks are supported at this station are preferably not grooved and are provided with rubber inserts 140. Thus sufficient friction is obtained to positively rotate the blanks despite their frictional engagement with the forming tools 100.

After the bottoms of the tubes have been formed, the tubes are, as brought out above, annealed and finally discharged from the end of the machine. In the last several forming stations the rollers 80 are omitted and to prevent the ends of the tubes from coming together, a suitable asbestos dividing plate 145 is provided. This dividing plate is disposed longitudinally of the machine adjacent the discharge end thereof, being supported in any desired manner (not shown). It positively insures that the formed ends of the tubes will not contact each other during the travel of the tubes through this portion of the machine.

From the above, it is believed, that the operation of the machine will be clearly apparent. The rollers 17 are positively driven from the shaft 27 and these rollers in turn support and frictionally drive the rollers 20 which support the hollow glass blanks being formed. The blanks are fed to the machine at one end thereof and are carried through the machine by the transfer bars which are periodically actuated to lift the blanks from one processing station to another. It is to be understood that suitable control mechanisms are provided so that each time the transporting bars are actuated, the rollers 80 and guards 90 are lifted. Also during the lifting of the blanks by the transporting bars, the supply of fuel to the several burners is cut off by suitable mechanism.

After the blanks have been preheated, they are constricted by hot flames and are then positively drawn apart by the rollers 80ᵃ. The closed ends of the blanks are then heated to such an extent that they may be blown and the blanks are then placed with their heated ends in position to engage the forming tools 100.

During the bottom forming operation the blanks are positively rotated and air under substantial pressure is supplied to the open ends of the blanks. This causes the blanks to be properly shaped by the forming tools, the portions 103 of the forming tools constituting abutments to prevent the ends of the tubes from being ruptured by the fluid under pressure within the tubes. The amount of air supplied to the tubes may be regulated, and provision is made to permit the excess air to escape so that the ends of the tubes will not be distorted.

After the bottoms of the tubes have been formed, the tubes are annealed, then carried through three processing stations without heating and finally discharged from the machine.

It will be apparent that the bottom forming tools may be given any desired shape to impart the desired shape to the end of the tube being formed. In Figure 5 of the drawings, a slightly modified forming tool is disclosed, this forming tool being so shaped as to impart an ampoule shape to the ends of the tubes being formed. As in the first described construction, this modified forming tool has a portion 103ª constituting an abutment for the end of the tube and portions 102ª and 104ª which engage the tube adjacent the end thereof. In each instance it will be understood that the end is formed by rotating the heated end of the tube while the latter is in engagement with a forming tool which constitutes an abutment for the end of the tube. During this operation fluid under substantial pressure is supplied to the interior of the tube so that the end thereof is blown against and properly shaped by the forming tool. The fact that the forming tool is open or in other words does not enclose the end of the glass blank, makes it possible to readily place the glass blank in engagement with the forming tool.

With reference generally to the method described in this application for shaping the bottoms of the tubes and with reference also to the forming tool provided for this operation, the following observations should be borne in mind. In the method of drawing apart measured glass tubes into two parts in the manner described in this application, it is frequently desired that the bottoms of the drawn apart sections should have some shape other than perpendicular to the side walls. In effecting the drawing apart operation, the original glass tube is heated at some intermediate point and the two halves of the tube are then drawn apart by means of screwed rollers which may, or may not, be driven. The plastic glass at the drawn apart ends of the tube sections folds in to form a substantially flat bottom on each of the sections. The bottom thus formed, while still plastic from the original heat or some subsequent heating, may be given other shapes. Round or like shaped bottoms may be formed by the introduction of slight air pressure into the sections of the tube through the open ends thereof. In this method of forming round bottoms, however, any variations in the wall thickness in successively fed glass tubes under the same conditions of heat will be reflected in the shape of the bottom, for the reason that the plasticity of the glass will vary. To eliminate this objection, it, of course, would be possible to accurately sort or classify the glass stock so that tubes of unvarying wall thicknesses may be fed into the machine. This, however, is an expensive and somewhat impractical method, the necessity of which is eliminated by the method and forming tool disclosed in this application.

By virtue of the disclosed forming tool, which, it should be noted, may be either manually manipulated or incorporated in a machine in the manner described, regularly shaped bottoms may be formed on the tubes regardless of the variations of the wall thickness of the tube sections. The forming tool is, of course, of heat resisting material and is so shaped that it presents a horizontal bearing for the glass tube engaging the latter from a distance behind the heated area, the forming tool changing from the horizontal to the shape desired at its opposite end. A vertical section through the forming tool will represent the desired half shape of the bottom to be formed. The previously flat-bottomed tube sections are rolled against the forming tool and are blown to conform to the shape of the forming tool. The tube section contacts the forming tool only tangentially, the horizontal portion of the forming tool not being cut out to accommodate the tube diameter. Thus, when using this forming tool in the method described, the tubes may be heated sufficiently to render plastic the heaviest walled tubes, since the lighter walled tubes, even though excessively heated will not have their ends blown to a ball shape because of their engagement with the forming tools. Thus it will be apparent that classification of the stock as regards wall thickness may be eliminated without danger of imperfectly forming any of the tube ends.

While the invention has been described as being embodied in a machine for forming the ends on test tubes or the like, it is to be understood that the invention may be embodied in machines for forming other glass objects. The right is reserved therefore to make such changes in the details of construction and arrangement of parts as will fall within the purview of the attached claims.

What I claim as my invention is:

1. In a machine for shaping the closed end of a hollow glass body, a forming tool having a portion constituting an abutment for the tip of said closed end and having a second portion disposed wholly to one side of the said abutment adapted to shape the portion of the body adjacent the tip end thereof, both portions of said tool being flat in a direction transversely of the longitudinal axis of the tool, means for blowing the closed end of said body into engagement with both portions of said forming tool, and means for rotating said body.

2. In a machine for shaping the closed end of a hollow glass body, an open forming tool providing a surface transversely flat but longitudinally shaped to the half shape of the end to be formed, means for supplying fluid under pressure to the interior of said body to blow the closed end thereof into engagement with said forming tool, and rotatably driven rollers having friction inducing surfaces supporting said glass body and rotating the same.

3. In a machine of the class described, means for heating one end of a glass tube, a forming tool, means for rotatably supporting the glass tube with the heated end thereof adjacent said tool, a disc engaging the other end of said glass tube, and means for supplying air under pressure to the interior of said glass tube by way of an opening formed through said disc to blow the heated end of the tube into engagement with said tool, said disc being grooved to provide for the escape of excess air.

4. In a machine of the class described, means for intermittently moving a tubular glass blank in a direction normal to its longitudinal axis, means for supporting said blank during the intervals that the same is not moved by said first mentioned means, members adapted to engage said blank for urging the same into engagement with said supporting means, means for moving said members into and out of engagement with the blank, means for heating a portion of said blank, and spaced plates movable with said members providing an insulating air space disposed between said heating means and said members to protect the latter.

5. In a machine of the class described, oscillatable transport bars for intermittently moving a tubular glass blank in a direction normal to its longitudinal axis, means for so supporting glass blanks that they may be picked up by said transport bars, and means for adjusting said supporting means to a position where the blanks supported thereby may not be engaged by said transport bars.

6. In a machine of the class described, means for intermittently moving a tubular glass blank in a direction normal to its longitudinal axis, means for rotatably supporting said blank during the intervals that the same is not moved by said first mentioned means, means for heating said blank at a point intermediate its ends, means for drawing apart sections of the blank on opposite sides of the heated portion thereof, additional means for heating the drawn apart ends of the blank, a pair of forming tools for shaping the drawn apart ends of the blank, each forming tool being longitudinally shaped to the half shape of the contour desired in the finished end but being transversely flat, and means for annealing the shaped ends of the blank.

7. In a machine of the class described, means for supporting a glass tube, means for heating one end of the glass tube, a forming tool adapted for engagement with the heated end of the tube, a conduit for supplying air under pressure to the interior of the glass tube, a valve for controlling the flow of air through said conduit, a stem for said valve and means for actuating said valve including a movable cam, a lever arranged to be actuated by said cam, and an adjustable actuating connection between the end of said lever and said valve stem.

8. In a machine of the class described a pair of rotatably driven rollers, a glass tube supported in the angle between said rollers and frictionally rotated thereby, means for heating the glass tube, a third roller adapted for engagement with the upper surface of said tube for holding the same in engagement with the first mentioned rollers, means for moving said third roller into and out of engagement with the tube, and a pair of plates spaced apart and movable with the said third roller to assume a position between said third roller and the heating means when the third roller is in engagement with the tube.

9. In a machine of the glass described, oscillatable transport bars for intermittently moving a tubular glass blank in a direction normal to its longitudinal axis, means for feeding glass blanks to said transport bars including a pair of arms on which said blanks are supported and from which the blanks are moved by the transport bars, and means for rocking said arms to a position where the blanks supported thereby are out of the path of movement of the transport bars.

10. Those steps in the method of shaping an end of a glass body which consist in rotating the body and effecting line contact only between the body and a shaping surface, the line contact between the shaping surface and the body extending over the end of the body to be shaped and along the side of the body adjacent said end.

11. The method of shaping the closed end of a hollow body which consists in heating the closed end of the body, rotating the body, discharging a fluid under pressure into the body, and effecting a line contact only between the end of the body to be shaped and a shaping surface, the line of contact between the shaping surface and the body extending over the end of the body to be shaped and along one side of the body adjacent said end.

12. In a machine for shaping a glass body, means for heating the body, a tool providing a shaping surface which is shaped in one direction to the contour to be imparted to the glass body but which is flat in a direction normal to the first mentioned direction, and means for rotating the body in engagement with the shaping surface provided by the tool.

13. In a machine for shaping a glass body, means for heating the body, means for rotating the body, and a tool adapted for engagement with the body, said tool being shaped in the direction of the axis of rotation of the body to the contour to be imparted to the body but being flat in a direction normal to the axis of rotation of the body.

14. In a machine for shaping the end of a glass body, means for heating the end to be shaped, means for rotating the glass body, and a tool adapted for engagement with the end of the body to be shaped, said tool being shaped in the direction of the axis of rotation of the body to the contour to be imparted to the body and extending partially over the end of the body but being flat in a direction normal to the axis of rotation of the body.

15. In a machine of the class described, means for heating a hollow glass body, a forming tool, means for rotatively supporting the glass body in engagement with said tool, a member engaging the open end of said body and means for supplying a fluid under pressure to the interior of said body by way of an opening formed through said member to blow the body into engagement with the tool, said member having means providing for the escape of excess air.

16. In a machine of the class described, means for supporting a hollow glass body, means for heating a portion of the glass body, a forming tool adapted for engagement with the heated portion of the glass body, a conduit for supplying a fluid under pressure to the interior of the glass body, a valve for controlling the flow of fluid under pressure through said conduit, a stem for said valve, means for actuating said valve including a movable cam, a lever arranged to be actuated by said cam, and an adjustable actuating connection between the end of said lever and said valve stem.

FELIX MEYER.